No. 670,916. Patented Mar. 26, 1901.
A. G. ENEAS.
SOLAR GENERATOR.
(Application filed Aug. 16, 1899.)
(No Model.) 6 Sheets—Sheet 1.
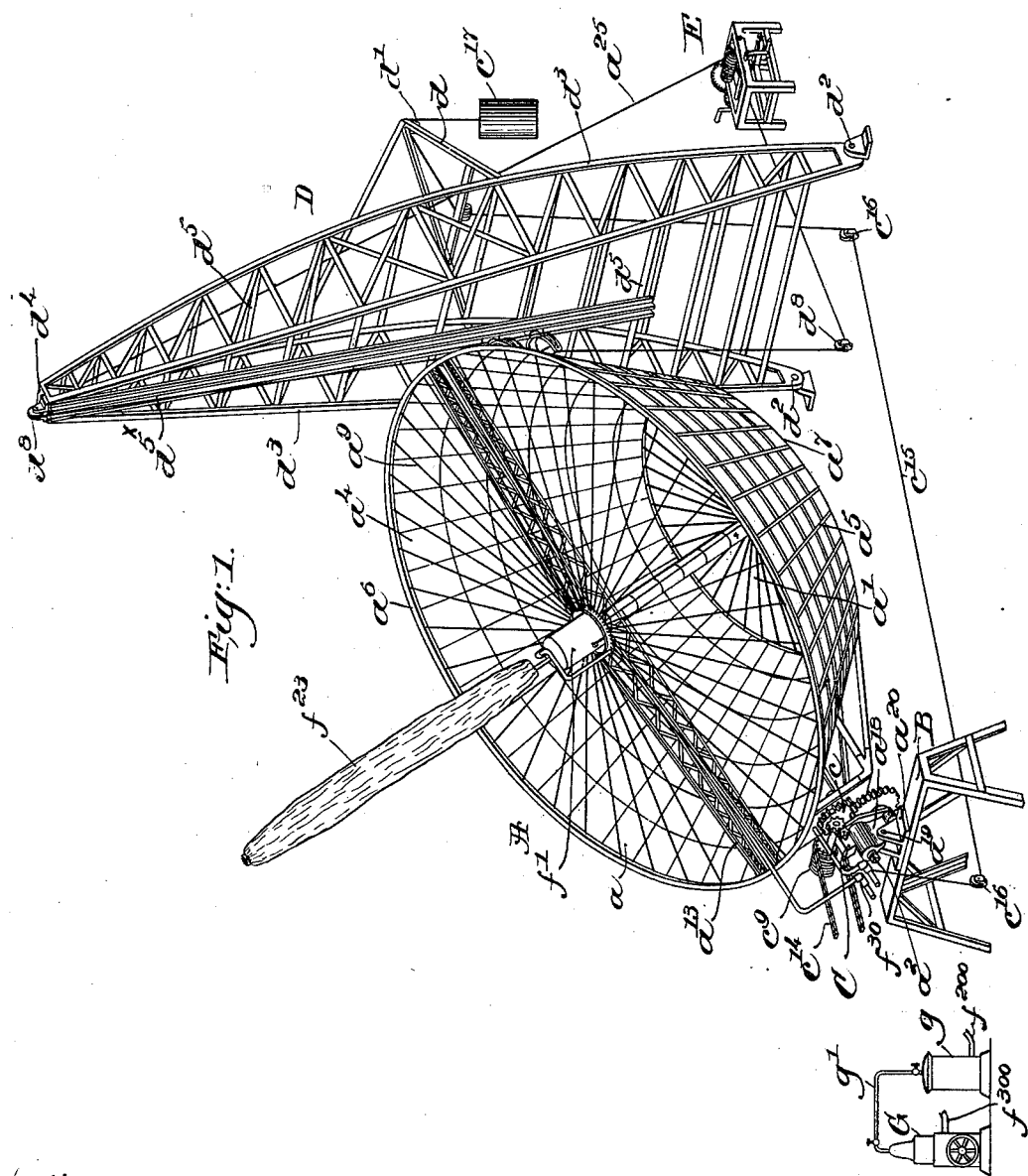

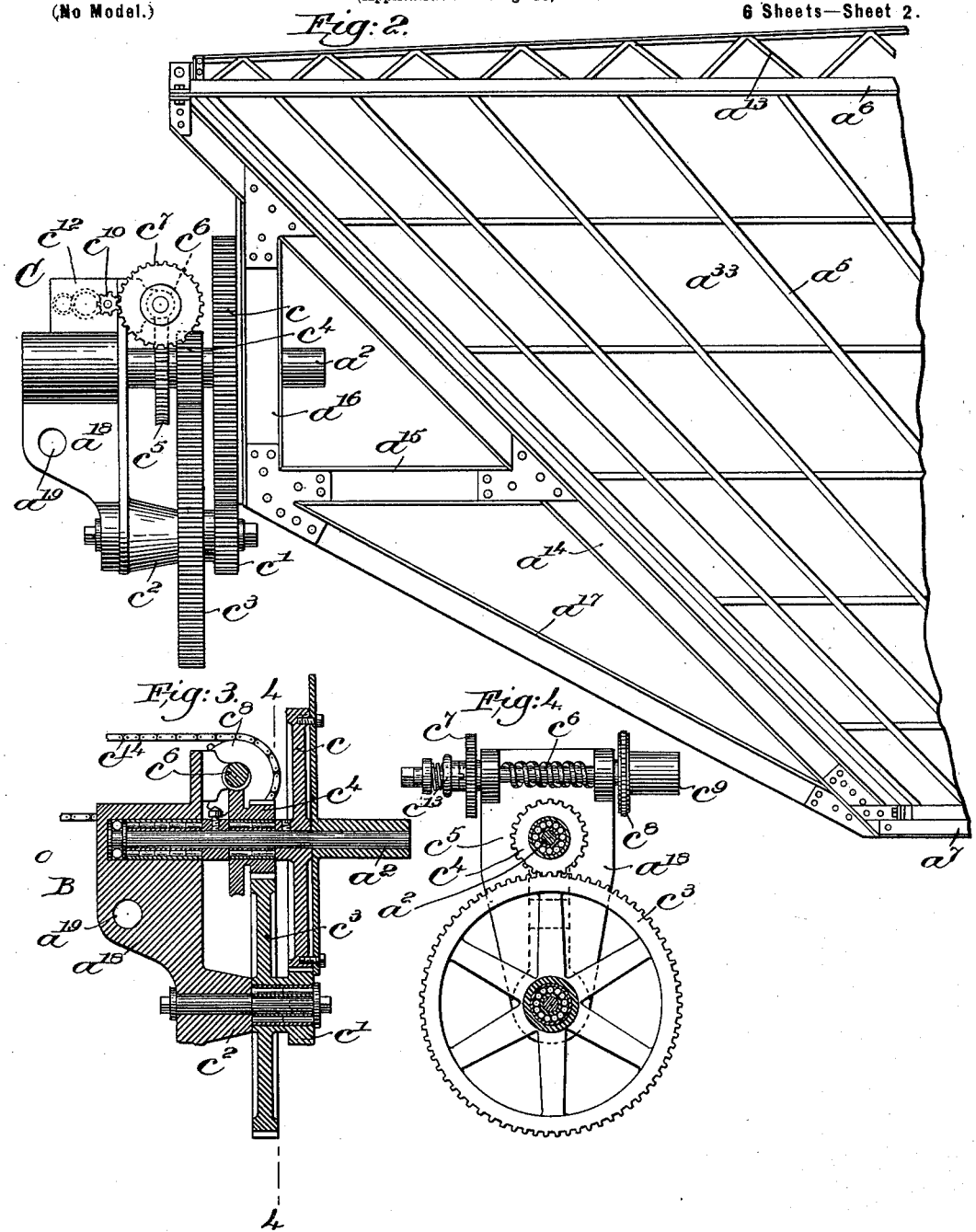

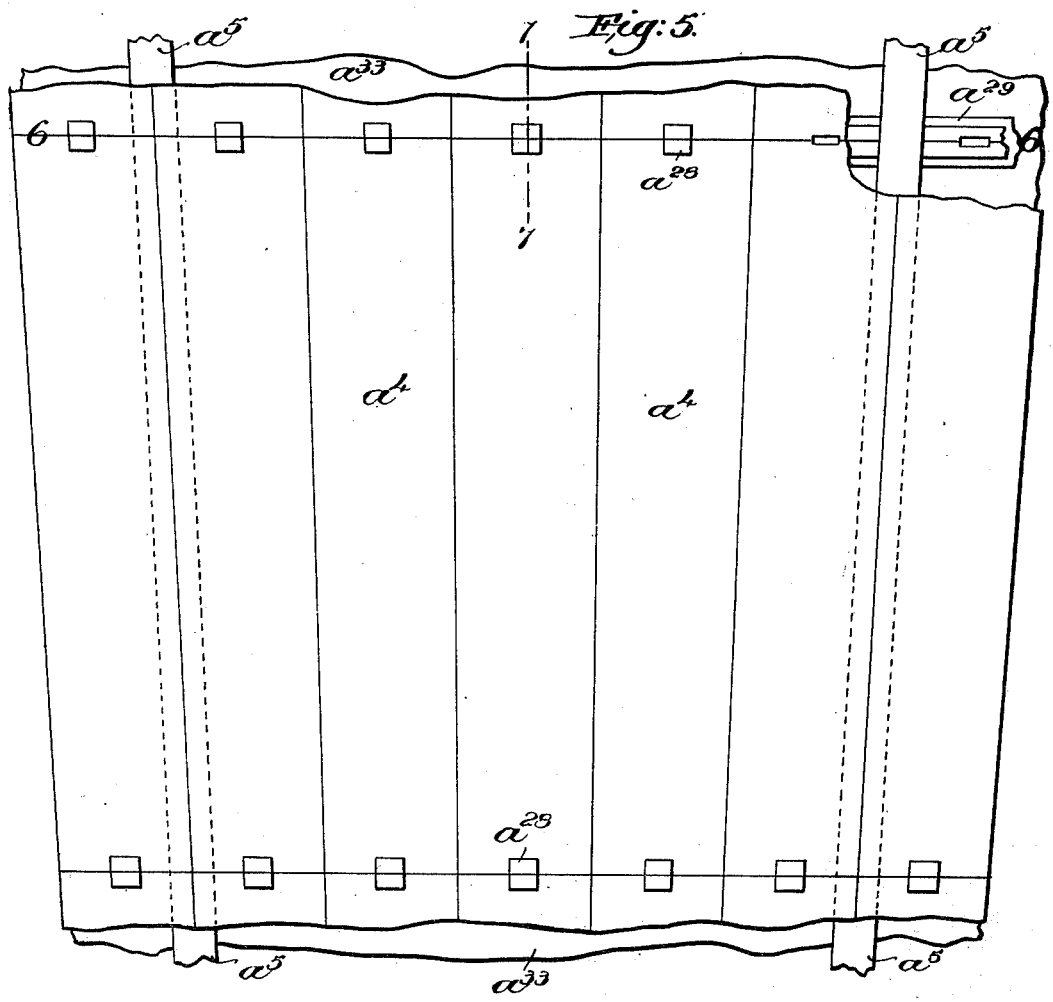
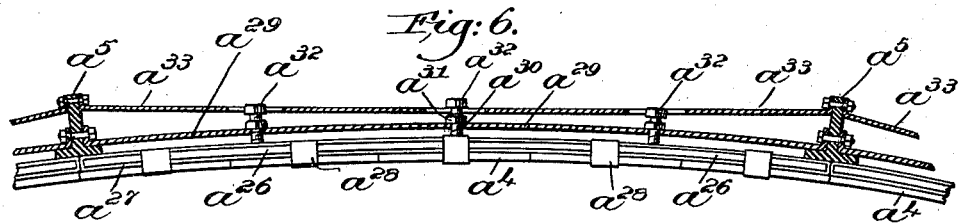
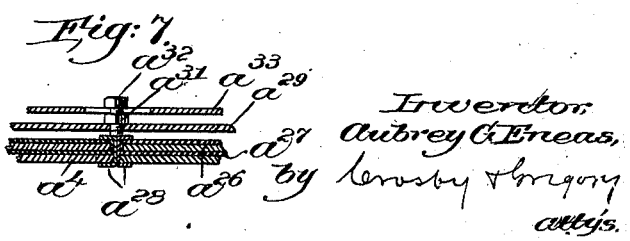

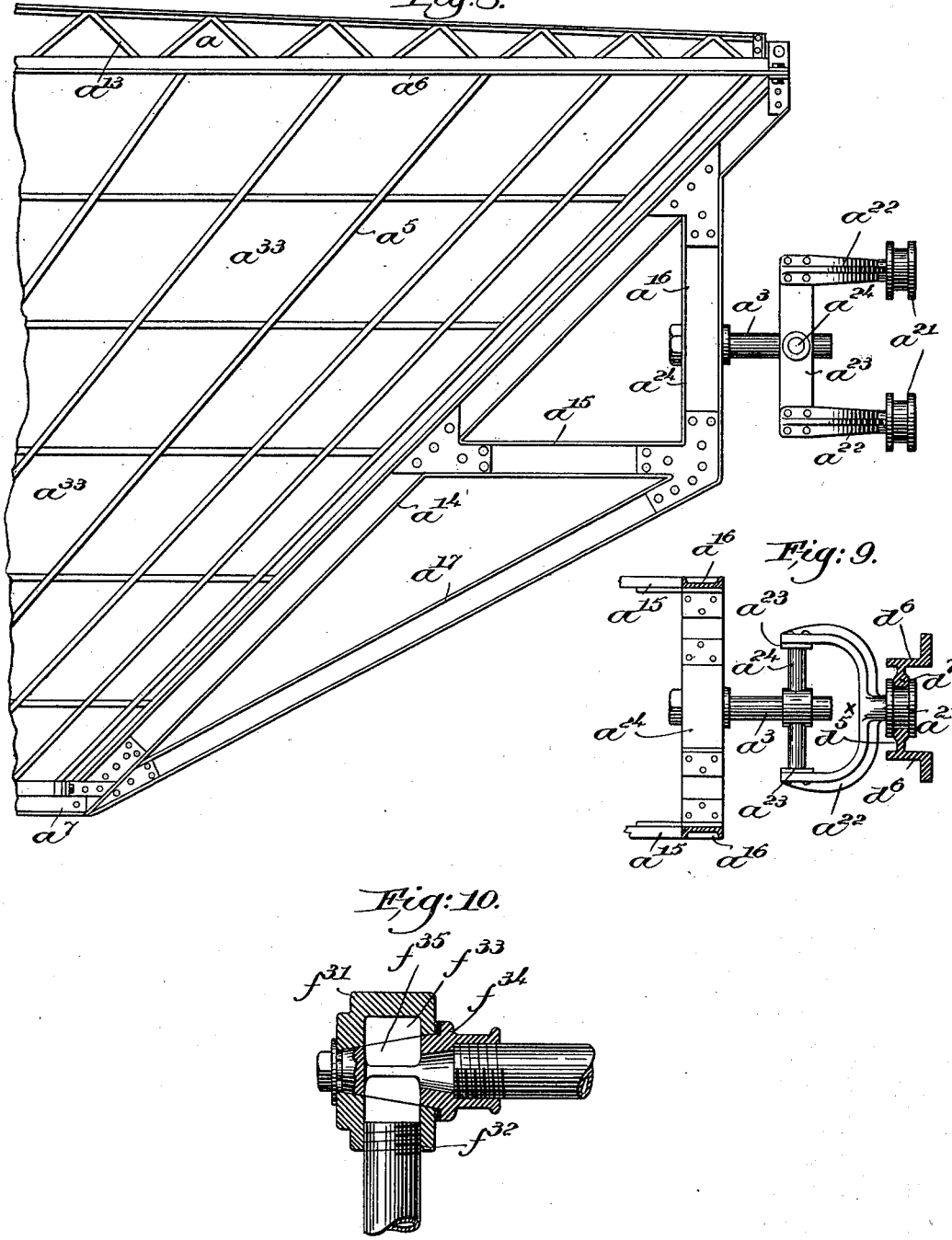

No. 670,916. Patented Mar. 26, 1901.
A. G. ENEAS.
SOLAR GENERATOR.
(Application filed Aug. 16, 1899.)
(No Model.) 6 Sheets—Sheet 5.
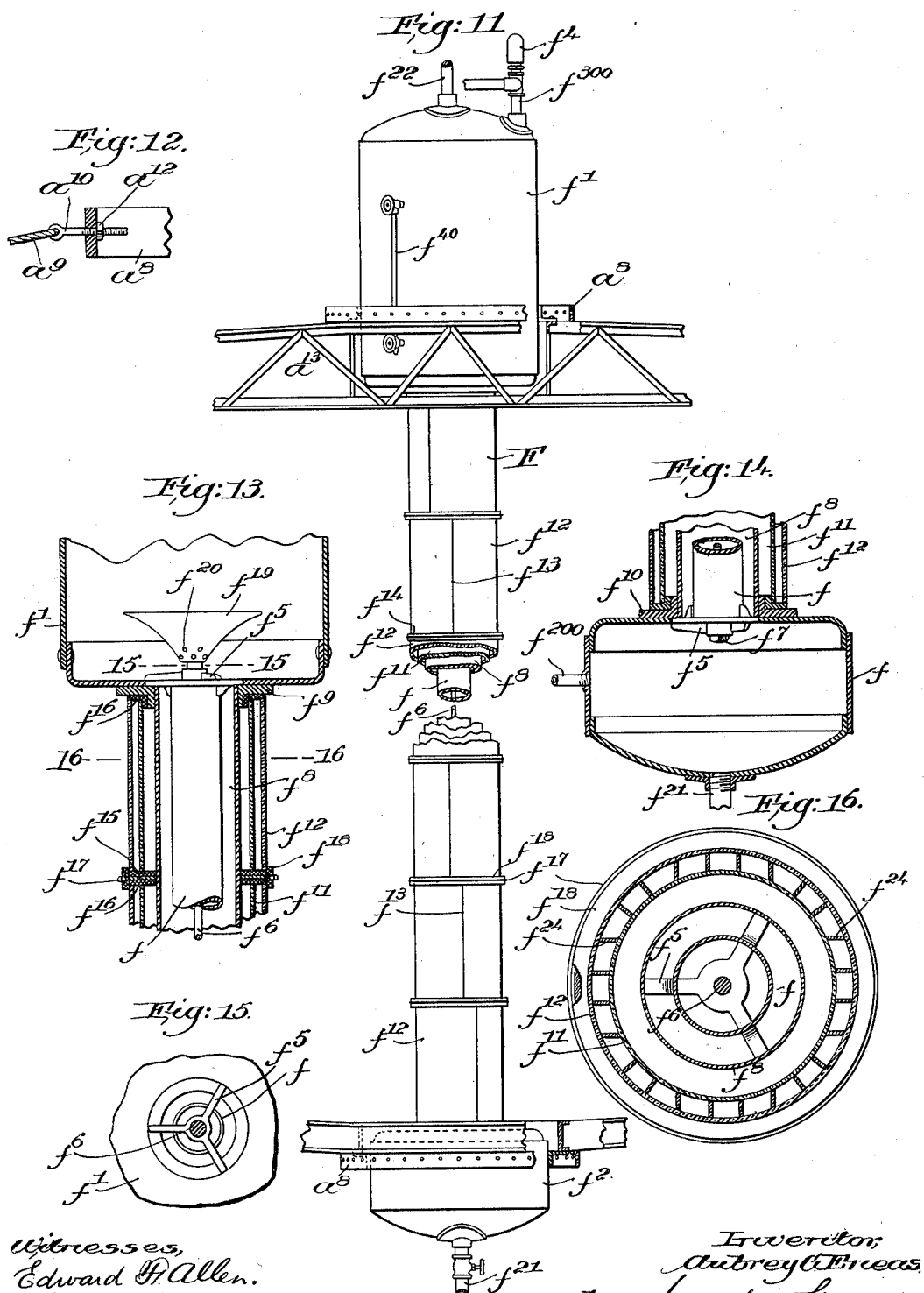

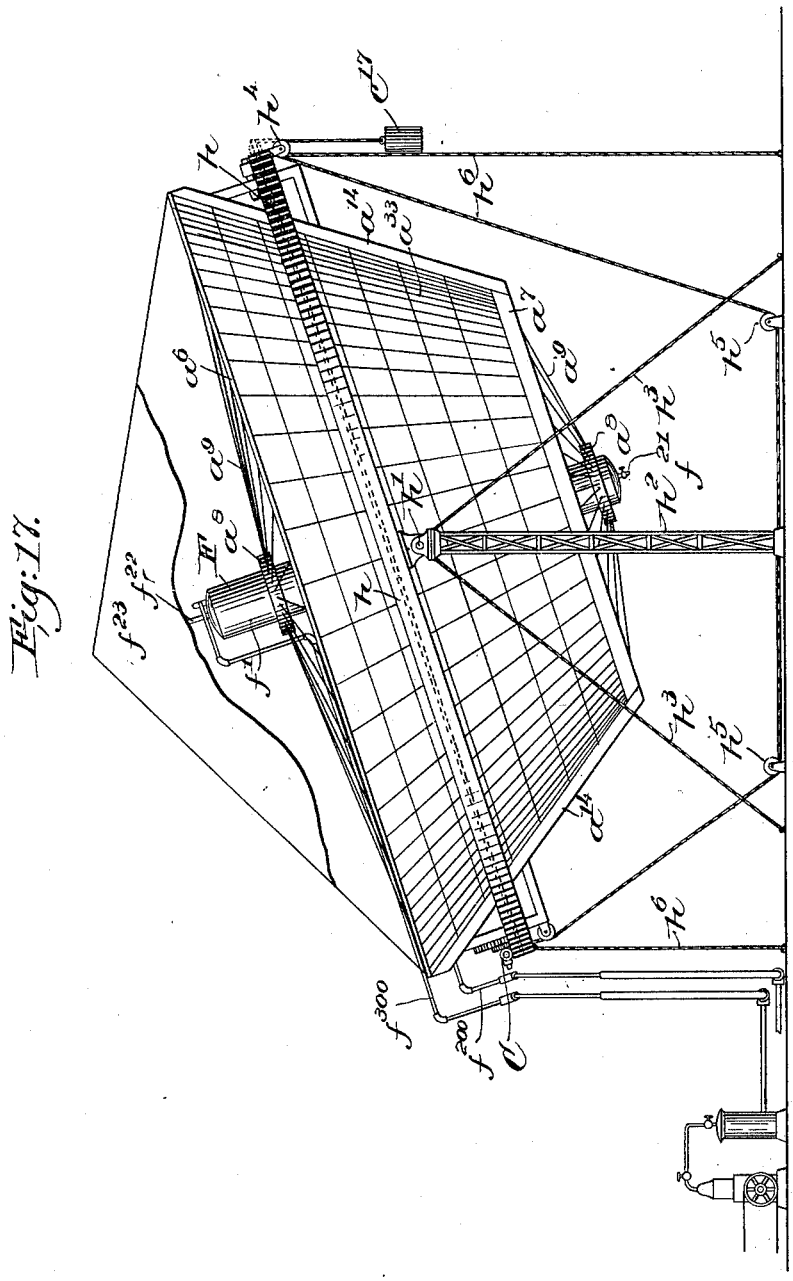

UNITED STATES PATENT OFFICE.

AUBREY G. ENEAS, OF BOSTON, MASSACHUSETTS, ASSIGNOR TO SOLAR MOTOR COMPANY, OF SAME PLACE AND JERSEY CITY, NEW JERSEY.

SOLAR GENERATOR.

SPECIFICATION forming part of Letters Patent No. 670,916, dated March 26, 1901.

Application filed August 16, 1899. Serial No. 727,351. (No model.)

*To all whom it may concern:*

Be it known that I, AUBREY G. ENEAS, a subject of the Queen of Great Britain, residing at Boston, county of Suffolk, State of Massachusetts, have invented an Improvement in Solar Generators, of which the following description, in connection with the accompanying drawings, is a specification, like letters on the drawings representing like parts.

My invention is an engine or solar generator which, while adapted for generating power to be used for any purpose, is especially intended for use in connection with irrigation of the arid plains of the west. Various attempts have been made in this direction, and a large number of devices have been invented; but so far as I am aware they have all been inefficient to a greater or less extent in vital points, and while some of them have been capable of generating sufficient steam to produce motion they have been incapable of doing practical work continuously in sunshine. In my investigations I have made what I believe to be an important discovery and have produced an engine which comprises in general terms a reflector which receives the sun's rays and transmits them to the central boiler or steam-generator in the focus of said reflector or series of mirrors or reflecting-surfaces, said boiler preferably containing a combined water and steam drum or safety appliance at the upper end and a settling-chamber at the lower end and being otherwise of special and important construction in detail, the whole apparatus being mounted on opposite supports in order to be handled readily and offer a minimum resistance to the enormous wind-pressure and having mechanism for maintaining the mirrors properly directed relatively to the movements of the sun.

The various constructional details, manner of operation thereof, and advantages of my invention will be more fully pointed out in the course of the following description, reference being had to the accompanying drawings, in which I have shown one embodiment of my invention, and the latter be more particularly defined in the appended claims.

Figure 1 is a perspective view of a preferred embodiment of my invention. Fig. 2 is an enlarged detail, in side elevation, of the lower end or side of the reflector and turning mechanism. Figs. 3 and 4 show details of the latter mechanism respectively in central vertical cross-section and in front elevation. Fig. 5 is an enlarged plan view of a fragmentary portion of the reflector. Fig. 6 is a cross-section taken on the line 6 6, Fig. 5. Fig. 7 is a sectional view taken on the line 7 7, Fig. 5. Fig. 8 is a view similar to Fig. 2, showing the opposite end of the reflector. Fig. 9 is a top plan view of the slide for supporting the upper end of the reflector on the upright frame. Fig. 10 is a sectional detail of one of the flexible joints. Fig. 11 is a fragmentary view showing the steam-generating apparatus in enlarged side elevation. Fig. 12 is a sectional detail of the tension-frame. Figs. 13 and 14 are enlarged vertical sectional views of the top and bottom portions of the steam-generating apparatus. Fig. 15 is a transverse section on the line 15 15, Fig. 13. Fig. 16 is an enlarged cross-section taken on the line 16 16, Fig. 13. Fig. 17 is a side elevation of a modified construction of supporting apparatus or framework.

Referring to Fig. 1, which shows my apparatus complete, it will be seen that it comprises, speaking generally, a reflector A, having upper and lower tension supporting-frames $a$ $a'$, a lower base or supporting frame B, provided with a clockwork or other turning mechanism C for keeping the reflector in proper alinement with the sun as the latter moves in its course, and a main support or frame D for supporting the upper end of the reflector, the reflector having opposite trunnions $a^2$ $a^3$ for carrying the same supported on the two end supports, while being left free to turn or rock transversely, the reflector being also capable of movement in a direction at right angles to its said swinging movement in order to adjust it to the declination of the sun at any given period of the year, mechanism E being indicated for accomplishing this movement.

Referring now to Figs. 2 to 9, in which I have shown the reflector in enlarged detail, it will be seen that the reflector is made up of a plurality of series of tiers of reflecting-plates, mirrors, or surfaces $a^4$, each tier containing a plurality of individual glasses or plates set next to each other in a circle about the reflector, the reflector itself being herein shown as in the form of a truncated cone, although it will be understood that I do not limit myself to a conical form, inasmuch as the same may be varied, and for certain purposes I have found a parabolic form advantageous.

The frame which supports the mirrors $a^4$ is made of vertical angle-iron $a^5$, as clearly shown in Fig. 6, connected at their ends to the upper and lower rings $a^6$ $a^7$, these rings constituting an important part of my invention.

It is necessary in such an apparatus as this, for reasons set forth later on, that the reflecting-surface should be of considerable extent, a practical size being thirty-two feet in diameter, and it is obvious that the wind-pressure on such a large surface will be considerable, amounting under ordinary conditions to several tons, and also for ease of movement it is desirable that the weight of the apparatus should be as light as possible and that it should be balanced. Accordingly I have devised the present apparatus, being light in weight and yet exceedingly strong and balanced by being supported on opposite trunnions.

The top and bottom tension-frames are similar in construction, and therefore it will suffice to describe one only.

Referring to the upper frame, it comprises an outer ring $a^6$ and an inner strain-ring $a^8$, connected together by a large number of wires $a^9$, extending radially between the two rings and held under tension by means of eyebolts $a^{10}$, (see Fig. 12,) adjusted by nuts $a^{12}$, passing through the small central ring $a^8$. By this means not only can great strength be attained, but also a simple and convenient means for adjusting the reflector-frame is provided, whereby any inaccuracy of circular form in the reflector-frame may be readily corrected.

As is well known, it is almost impossible to get a large frame, like the reflector-frame shown, into absolutely-true curvature, and this difficulty has proved one of the most serious obstacles in the construction of solar generators of any type, so that I regard this part of my invention as being of vital importance. Indeed, one of the objects whose attainment has given me the greatest difficulty has been the devising of practical means for bringing the mirrors into the required position.

In the construction of my engine I prefer to employ a diametrical truss $a^{13}$, extending in line with the supporting-trunnions $a^2$ $a^3$, so as to take up any longitudinal strains due to the support D or other causes in connection with the operating machinery and framework of the machine.

At its lower end I secure to the reflector a trussed trunnion-support comprising uprights $a^{14}$, secured to the reflector-frame, and horizontal and vertical channel-irons $a^{15}$ $a^{16}$, braced by oblique struts $a^{17}$, extending from the outer meeting ends of these channel-irons to the lower tension-ring of the reflector, the trunnion $a^2$ being suitably mounted in this support and extending forward therefrom and journaled at its free end in a casting $a^{18}$, pivoted at $a^{19}$ to a block $a^{20}$ on the frame B. The trunnion $a^2$ carries a gear $c$, fast on the trussed bearing, and on the trunnion and in mesh with a pinion $c'$, journaled in a projection $c^2$, adjacent the pinion $c'$ and fast therewith, is a gear $c^3$, meshing with a pinion $c^4$, loose on the trunnion $a^2$ and fast with a worm-wheel $c^5$, driven by a worm $c^6$ on a shaft having a gear $c^7$ at one end and a sprocket-wheel $c^8$ and a drum $c^9$ at its other end. The gear $c^7$ is in mesh with a pinion $c^{10}$, connected with the clock mechanism $c^{12}$, the details of which it is unnecessary to describe, for regulating the movement of the reflector, the gear $c^7$ being loose on the worm-shaft and connected thereto by a spring-clutch $c^{13}$, so that the clockwork can be connected or disconnected from the driving mechanism whenever desired. The sprocket-wheel $c^8$ is driven by a sprocket-chain $c^{14}$, leading from any suitable power, as the steam-engine G, which is operated by the solar generator, if desired, and the drum $c^9$ has a rope or cable $c^{15}$ leading therefrom over guide-pulleys $c^{16}$ to a bracket $d$, having a pulley $d'$ at its outer end, from which is suspended a weight $c^{17}$ from the rope $c^{15}$. The bracket $d$ projects rearwardly from the support D and acts, together with the weight $c^{17}$, as a counterbalance for the support D and also as a constant driving means for the mechanism C. It will be understood that this driving mechanism may be varied indefinitely within the scope of my invention, there being shown herein merely a convenient and appropriate mechanism for the purpose; but I do not restrict myself in any way to the details of this mechanism.

I regard the double provision for operating the clockwork or turning mechanism C as of considerable importance, inasmuch as it permits of the clockwork being operated by means of a weight reinforced by power from the engine, so that on windy days, when the weight alone would not suffice to turn so large a reflector, no inconvenience need be experienced, and, on the other hand, the weight will serve as an independent power to partly operate the machine and keep it in focus to receive the sun's rays on cloudy days, when the engine may be idle.

The support D is herein shown as a trusswork pivoted at $d^2$ and comprises opposite trusses $d^3$, connected at their upper end at $d^4$ and preferably provided with cross-braces $d^5$. At its front end the support D has a guideway $d^{5\times}$, (shown in perspective in Fig. 1 and in cross-section in Fig. 9,) this guideway being made up of opposite angle-irons $d^6$, having heads $d^7$, in which travel opposite flanged wheels $a^{21}$, journaled on the ends of yokes $a^{22}$, secured at the ends of uprights $a^{23}$, connected by a cross-bar $a^{24}$, loosely journaled to the trunnion $a^3$, before mentioned, said trunnion being carried by an end trussed frame $a^{24}$, similar in construction to the frame already described at the opposite end of the reflector.

The trolley constructed by the flanged wheels $a^{21}$, &c., just described, is raised and lowered along the guide-track $d^{5\times}$ by a rope or cable $a^{25}$, secured at its ends to the trolley and passing over guide-pulleys $d^8$, one at the base of the machine and the other at the top of the support D, said cable being moved in either direction by a suitable windlass or other mechanism E.

While I have herein described and shown one form of supporting means, I wish it understood that I am in no wise limited to this form of apparatus so far as the broad features of my invention are concerned, inasmuch as the reflector may be mounted in any other supporting apparatus, as may be preferred.

I desire to lay special emphasis on one feature of my invention, which consists in making both ends of the reflector open—that is to say, this important feature resides in making the lower end of the truncated cone open, as shown in Fig. 1, this construction affording free outlet to the air and reducing to a minimum the wind-pressure on the apparatus. As already noted, the wind-pressure is most serious to the practical operation of this type of engine, and I have proved that, having the reflector open, as shown, a construction may be employed which is capable of practical and accurate use not otherwise possible.

A further important reason for employing my reflector in the form of a frustum of a cone is that a cone tends at its lower end to lower the temperature in the adjacent end of the boiler, inasmuch as it has not a sufficient extent of reflecting-surface to develop the minimum temperature which the boiler should have to make steam freely. The truncated cone, as herein shown, has its sides at an angle of forty-five degrees to the central axis, and in this connection I will more fully describe the reason why it is necessary to have a large reflector and why it is specially advantageous that it should be in the form of a truncated cone.

It has been repeatedly demonstrated in steam-engineering practice that to generate steam in quantity the temperature surrounding the steam-generating apparatus must be in excess of 1,000° Fahrenheit, and even at this temperature the rate of evaporation per square foot of heating-surface per hour is very small, being not over one and one-half pounds. Hence it is evident that there must be an enormous condensation or concentration of the sun's rays in an open-air apparatus of this kind in order to meet the above requirements. I am aware that many attempts have been made to reach practical results with a sun-engine, and I believe that many of the failures have been due to the fact that the designers or inventors did not make the discovery that I have made and which will appear more fully from further explanation. In the first place the boiler or steam-generating apparatus must of course be large enough to do work, and if we suppose that it is eight inches in diameter then it follows, bearing in mind Newton's law that the temperature of radiant heat varies as the density or concentration of the rays, that the least practical size for the reflector is about sixteen feet, which would make a concentration of twenty-five times the original density of the rays. This explains the reason for employing a reflector of the relative size shown in my apparatus.

Now as to the truncated form, which constitutes a very important discovery and feature of my invention, it will be seen that if a conical reflector were used, brought down to a small diameter at its lower end, the resultant concentration of heat on any practical size of boiler or water-carrying pipe could not possibly be enough to produce a temperature about the adjacent portion of the pipe or boiler onto which it would reflect the heat to cause the water therein to boil, or, in other words, the result would be that the boiler or steam-generating pipe would radiate onto the reflector the heat received from the larger upper half of the reflector instead of the latter giving off heat to the steam-generating apparatus. The temperature of the boiling water under pressure would be in excess of that developed by the small area of the lower end of the reflector-cone. The constant of concentration is low, being about 30° Fahrenheit, and hence the reflector must be so designed as to produce for practical results a temperature in excess of the boiling-point of steam at workable pressure (say thirty pounds, corresponding to a temperature of 240° Fahrenheit under ordinary atmospheric pressure,) and therefore the minimum circumference of the reflecting-surface must be at least eight times the diameter of the steam-generating apparatus.

The tension-frame already described is also of importance in offering very slight resistance to the wind and offering practically no obstruction to the passage of light.

Referring further to the details of the reflector, it will be seen, viewing Figs. 5 and 6, that I have provided mirrors or reflecting-surfaces $a^4$ in a plurality of facets, there being five of these shown between contiguous T-irons $a^5$ in Fig. 5. This considerably cheapens the cost of the reflector, as it does away with the necessity of providing an extended curved surface. The facets are mounted on transverse supports $a^{26}$, shown as metal plates, these plates being bent to a curvature somewhat greater than that required for the reflector, the supports $a^{26}$ being covered by a band $a^{27}$ of rubber, felt, or other cushioning-surface to prevent the facets from being injured by any jar. The facets are secured in any suitable manner, metallic clips $a^{28}$ being shown embracing the facets about the middle of their ends. (See Figs. 5, 6, and 7.) Behind the supports $a^{26}$ are bearing plates or bars $a^{29}$, in which I mount a plurality of threaded bolts $a^{30}$, each provided with a check-nut $a^{31}$ and head $a^{32}$, the inner ends of the bolts bearing against the supports $a^{26}$, so that the curvature of the reflector may be varied with the most delicate accuracy simply by tightening or loosening these bolts at the point whose curvature requires changing. I have found that even with glass mirrors used as facets the glass will bend to a sufficient degree to get sufficient curvature with extreme accuracy. This curvature is with respect to two axes at right angles to each other, or the facets may be made so as to throw a number of nodal points reflecting to a common center.

The construction of reflector-frame already described enables me to insert plane back plates $a^{33}$. (See Fig. 6.) These removed back plates or backing being inexpensive, inasmuch as they do not require to be curved to fit the curvature of the reflecting-surface, and they also provide an air-space between the reflecting surface or facets and the backing, which tends to prevent extremely-sudden changes of temperature and offers protection to the reflector.

Referring now to Figs. 11 to 15, in which I have shown the details of construction of the boiler or steam-generating apparatus F, it will be seen that I provide an inner tube $f$, preferably of copper, extending from the bottom of the reflector to the top—i. e., having at least as great length as the depth of the reflector. One object had in view in constructing this boiler is to obtain a boiler capable of withstanding exceedingly-high temperatures, the construction, as heretofore employed, so far as I am aware, having been incapable of using a higher temperature than such as will destroy the strength of metal, which may be placed roughly at 700° to 800° Fahrenheit, whereas for practical results I have found it necessary that the temperature should be much higher than that above stated, and to that end I have made the steam-generating part of my apparatus in the form of a specially-constructed circular tube or body having a steam and water drum proper, $f$, at its upper end entirely out of focus with the reflector, and preferably provided with a settling-chamber $f^2$ at its lower end also out of focus with the reflector, it being understood that the water is supplied to the apparatus by an inlet-pipe $f^{200}$ and the steam is conveyed therefrom for use by or through an outlet $f^{300}$ at the top of the boiler, a safety-valve $f^4$ being also preferably employed.

The apparatus will be maintained full of water up to a point in the boiler $f'$ entirely out of range with the focusing influence of the reflector, the height of the water being determined by a water-gage $f^{40}$.

Inside the boiler $f'$ and settling-chamber $f^2$, respectively, are spiders or multi-armed castings $f^5$, connected by a rod $f^6$, tightened by a nut $f^7$, which serves to hold the parts in place.

The metallic tube $f$ is made of very thin metal, so as to offer the slightest resistance to free circulation of heat, and is surrounded concentrically by a similar tube $f^8$, held at its opposite ends by flanged rings or plates $f^9 f^{10}$, and outside of the tube $f^8$ is a glass jacket $f^{11}$, and there are preferably a number of these jackets, a second one, $f^{12}$, being herein shown, the glass jackets being provided for the purpose of preventing loss of heat by radiation, each glass tube affording a space for an air-jacket about the inclosed tube. The loss of heat and tendency to radiation are proportional to the differences in temperature between the outside and inside, and hence the provision of an air-jacket reduces the tendency to radiate heat, and also the glass refracts the heat rays which strike it obliquely and tends, therefore, to gather in stray rays which would otherwise be lost, and for this reason I term the glass cylinders or tubes "concentrators," inasmuch as they act to gather in or converge the heat rays from the reflector. Each glass tube is split longitudinally and circumferentially, as indicated at $f^{13} f^{14}$, in order to provide means for safe expansion and contraction of the glass with varying temperature, and the sections of the glass are separated by flat metal rings $f^{15}$, of polished brass, which serve to divide the length of the air-chambers in the small compartments, and thereby decrease the circulation of the air in the air-jackets, this provision being of importance in reducing the radiation through the glass, due to conductivity of the glass, inasmuch as the radiation is more rapid in moving hot air. The glass rests on asbestos or other suitable cushioning-surface $f^{16}$, which maintains it out of contact with the hot metal, there being a layer or ring of asbestos at the top and bottom of each glass section, and the sections are held in place by tie-wires $f^{17}$, maintained out of contact with the glass by asbestos $f^{18}$. These separating parts are shown slightly exaggerated in the drawings for the sake of clearness.

A baffle-plate $f^{19}$ is secured centrally in the boiler above the circular pipes or tubes $f^8$, this baffle-plate being provided for the purpose of preventing the tendency of the ascending water to cause the water in the boiler to prime by the expansive ejection through it of the water below, and for this purpose—that is, producing dry steam free from entrained water—I have provided the boiler considerably larger than the tubes. The water descends in the inner tube $f$ and rises in the outer tube $f^8$, and the enlarged boiler permits the water rising in the pipe $f^8$ to freely pass out without priming. If steam rises on the surface of the water rapidly, it carries entrained water with it, which is liable to blow out the cylinder-head, and hence by providing a large boiler this possible disaster is guarded against. The baffle-plate preferably has a plurality of holes $f^{20}$ therethrough in order that the water may freely circulate in passing down to the tube $f$. A settling-chamber $f^2$ for all foreign substances—such as mud, &c.—to settle in, being provided with a blow-out pipe $f^{21}$ for the removal of accumulations, is below the focus of the reflector in order that there may be no liability of the mud, &c., being dried and burned by the direct action of the heat rays from the reflector.

The water-level is kept constant by the provision of a surface condenser $g$, connected by a pipe $g'$ to the pump and engine G, so that at every stroke of the engine it operates to pump back all the condensed water for that stroke, and the stroke is of such capacity as to be more than sufficient to handle all the condensed water, the result being that part of each stroke acts as a vacuum-pump, thereby making the boiler-feed of the engine automatic and at the same time using the same water over and over again. This latter feature acts also to reduce the possibility of scale formation in the engine-boiler.

I have omitted showing the details of the condenser and engine, inasmuch as they may be of any well-known type.

The inlet and outlet pipes $f^{200}$ $f^{300}$ are connected to the condenser and engine by flexible or movable joints $f^{30}$, shown in enlarged detail in Fig. 10, where it will be seen that a casting $f^{31}$ is screwed at $f^{32}$ to a portion of the pipe, said casting being transversely perforated and having a central chamber $f^{33}$, and a socket-piece $f^{34}$ is fitted in the perforation of the casting $f^{31}$ and provided with ports $f^{35}$, through which the steam or water may pass.

One important feature of my invention resides in making the steam and water drum $f'$ and settling-chamber $f^2$ of the same diameter, this feature providing a means for readily focusing the apparatus by observing the shadow of the drum. In an apparatus of this kind one of the most difficult and expensive parts of the machinery has been heretofore the complex focusing apparatus, it being understood that it is absolutely essential that the machine should be properly directed toward the sun. In my instrument when the shadow of the steam and water drum exactly covers the settling-chamber or coincides precisely with the shadow of the settling-chamber on the ground then the apparatus is properly directed.

In Fig. 16 I have shown a feature of my invention which is of considerable practical importance, being a provision for increasing the range of the steam-generator or its gathering power for concentrating the heat rays reflected from the facets of the reflector. Many of these rays, as will be readily understood, will not be reflected in directly-radial lines, inasmuch as the facets themselves will not be in exactly-correct curvature, and for other reasons I have found that there will be a large proportion of stray heat rays. Accordingly I provide between the supporting disks or plates $f^{15}$ and the boiler-sections sheets of polished metal $f^{24}$, preferably thin sheets of brass, silver-plated or nickeled or painted with enamel, &c., as elsewhere explained, arranged in parallel groups about the circulating-tubes, these polished plates or sheets serving to catch the stray rays which strike at an oblique angle and deflect them inwardly, thereby gathering in these stray rays, which would otherwise be lost. I have shown the reflectors $f^{24}$ as parallel to each other in groups, but do not limit myself thereto, inasmuch as they may be radially arranged or radially and parallelly combined.

In the regions of the world where this apparatus is most likely to be used there is considerable danger from hail-storms, which of course would prove disastrous to glass reflectors, and accordingly I have provided a staff $f^{22}$, extending from the back of the boiler in alinement with the vertical axis thereof, this staff carrying a canvas or other collapsible covering $f^{23}$, which may be folded, as shown in Fig. 1, when not required for use, and will then be entirely out of interference in any way with the operation of the machine, and it may be extended so as to cover the reflector at a moment's notice.

In Fig. 17 I have shown a different means of mounting my reflector, consisting of a ring $h$, in which the opposite trunnions of the reflector-frame are journaled to turn the same, as already described in connection with the apparatus shown in Fig. 1. The frame $h$ is pivoted at $h'$ at right angles to the trunnions, the pivots $h'$ being carried in opposite posts $h^2$, set in the ground or other base, and preferably stayed by guys $h^3$. The weight $c^{17}$ for operating the turning mechanism is supported from a pulley $h^4$ at one end of the supporting-ring $h$ and passes over direction-pulleys $h^5$ to the clockwork in an obvious manner, or it may pass around the ring $h$, as indicated in the dotted line. The ring is held at any given angle by means of stay-cables $h^6$, and the other parts have already been described. This form of mounting the reflector does away with the gearing for the movement required by the annual change in position of the sun and makes the handling of the heavy piece of apparatus quite easy, while, moreover, the wind-pressure on one half of the apparatus tends to balance the wind-pressure on the other half, and thus relieves the gearing of excessive strain. This counterbalancing feature last alluded to is, however, also a feature of the construction shown in Fig. 1.

In certain regions of the United States where the direct rays of the sun are intensely hot—as, for instance, in the higher altitudes of Colorado—I find it practical to omit certain features of my apparatus, and, indeed, it is feasible to operate the apparatus with very much less reflecting-surface than herein shown, and for certain purposes the sub-reflectors or auxiliary reflectors shown at $f^{24}$ in Fig. 16 may be chiefly relied upon.

The operation of my machine has already been described, which is, briefly stated, as follows: The reflector is tilted to suit the declination of the sun for the given day or month of the year by elevating or lowering the trunnion end $a^3$ along the track $d^{5\times}$, Fig. 1, by means of the mechanism E, the support D meanwhile automatically adjusting itself to the required inclination by turning on its pivots $d^2$. This having been done, the operator preferably disconnects the clockwork $c^{12}$ from the mechanism C and tilts or swings the reflector A on its trunnions into proper alinement with the sun for the given hour and minute of the day and then connects the clockwork, and the latter, through the driving power of the weight $c^{17}$, and in times of high wind or when otherwise necessary through also the driving-chain $c^{14}$, gradually turns the reflector on its trunnions $a^2$ $a^3$, so as to maintain it facing the sun throughout the working part of the day. The transverse truss $a^{13}$ aids the reflector in withstanding all longitudinal strains due to the support D, high winds, &c., and the tension-frame at the top and bottom of the reflector maintains the latter in its adjusted curvature, the upper tension-frame offering no obstruction to the free passage of the light and the lower tension-frame and open truncated end of the reflector affording free passage to the wind and also preventing, as already stated, the reflectors, if continued in the form of a true cone, from lowering the temperature of the boiler. Free circulation of the water is afforded from any suitable source through the inlet-pipe $f^{200}$ up between the inner tube $f$ and the outer tube $f^8$ and down through the inner tube, the steam escaping to the drum $f'$ and thence by the outlet-pipe $f^{300}$ to the steam-engine or other means employed for utilizing the steam generated by my apparatus. The air-jackets provided around the circulatory tubes $f\ f^8$ prevent radiation of the heat from the water and serve also to concentrate the rays of the sun, the latter effect being greatly increased by the reflectors $f^{24}$. The heat is further retained by having the jackets divided off into partitions, so that free circulation of the air is prevented.

If it should be seen that any of the facets are out of focus, they may be adjusted by means of the bolts $a^{32}$, and if any individual facet should get broken it may be replaced simply by removing the end clip and putting on another one.

While I have herein shown one preferred form of my invention and have described it in its details, I do not intend to limit myself in all respects thereto, inasmuch as many features of my invention are broadly new, and also as many substitutions and modifications may be resorted to without departing from the spirit and scope of my invention.

Having described my invention, what I claim as new, and desire to secure by Letters Patent, is—

1. A solar generator comprising a reflector, a support therefor, and means for changing the position of said reflector, said reflector having a truncated conical form open at top and bottom, with curved sloping walls composed of a large number of relatively small reflectors or facets very slightly concave, and all of which focus on the axis of the truncated cone which the reflector as a whole presents, all of the small reflectors which lie in the same plane having a common focus on some point in said axis, substantially as described.

2. A solar generator comprising a reflector, a support therefor and means for changing the position of said reflector, said reflector having a conical form, open at top and bottom, being truncated above its apex at such a distance as to provide a relatively large opening as and for the purpose described, a boiler and combined steam and water drum extending coaxially of said reflector, said steam and water drum being outside of the focal range of said reflector, and a settling-chamber at the lower end of said boiler and also outside of the focal range of the reflector, substantially as described.

3. A solar generator comprising a reflector, a support therefor, and means for changing the position of said reflector, said reflector having a truncated form and being open at top and bottom, the bottom, smaller opening having large area as and for the purpose described, and having its walls curved circumferentially and sloping in straight lines in planes including the axis, a boiler and combined steam and water drum, and a settling-chamber, extending coaxially of said reflector, said steam and water drum and settling-chamber being respectively at the upper and lower ends of the circulation apparatus, and both being beyond the focal range of the reflector, substantially as described.

4. A solar generator comprising a reflector in the form of a cone, a support therefor, and means for changing the position of said reflector, said reflector having a truncated form open at top and bottom and made up of a multitude of facets each curved very slightly with respect to two axes and the whole having the general curvature of the truncated cone, and a boiler and water-circulation apparatus extending coaxially of said reflector, substantially as described.

5. In a solar generator, a reflector for concentrating the sun's rays at a focus, a circulation-pipe for maintaining water in said focus, and a lateral projection at the upper end of said pipe, and another similar projection at the lower end, said two projections having the same size and shape in cross-section for determining the alinement of the apparatus with the sun, substantially as described.

6. In a solar generator, a reflector for concentrating the sun's rays at a focus, and means for maintaining water in said focus, said means comprising an outer and an inner tube or tubes provided with chambers at their ends, said tubes both opening into said chambers and permitting the water to flow downwardly in the inner tube and upwardly between it and the outer tube, substantially as described.

7. In a solar generator, a reflector for concentrating the sun's rays at a focus, and means for maintaining water in said focus, said means comprising an outer and an inner tube or tubes provided with chambers at their ends, said tubes both opening into said chambers and permitting the water to flow downwardly in the inner tube and upwardly between it and the outer tube, and a glass jacket surrounding said circulation-tubes, said jacket maintaining an air-space between it and said tubes for preventing radiation of heat from the latter, substantially as described.

8. In a solar generator, a reflector for concentrating the sun's rays at a focus, and means for maintaining water in said focus, said means comprising an outer and an inner tube or tubes provided with chambers at their ends, said tubes both opening into said chambers and permitting the water to flow downwardly in the inner tube and upwardly between it and the outer tube, and a plurality of jackets surrounding said circulation-tubes, said several jackets each maintaining an air-space about the said tubes for preventing radiation of heat from the latter, substantially as described.

9. In a solar generator, means for concentrating the sun's rays at a focus, a circulation tube or tubes at said focus for conveying water to be converted into steam, and a glass jacket surrounding said tube, said glass jacket being divided into sections transversely and longitudinally for permitting expansion and contraction of the glass, substantially as described.

10. In a solar generator, means for concentrating the sun's rays at a focus, a circulation tube or tubes at said focus for conveying water to be converted into steam, and a glass jacket surrounding said tube, said glass jacket being divided into sections transversely and longitudinally for permitting expansion and contraction of the glass, and yielding separators between the transverse joints of said sections, substantially as described.

11. In a solar generator, means for concentrating the sun's rays at a focus, a circulation tube or tubes at said focus for conveying water to be converted into steam, and a glass jacket surrounding said tube, said glass jacket being divided into sections transversely and longitudinally for permitting expansion and contraction of the glass, and partition-rings dividing the air-space inclosed by said jacket into compartments for preventing the free circulation of the contained air, substantially as described.

12. In a solar generator, means for concentrating the sun's rays at a focus, a circulation tube or tubes at said focus for conveying water to be converted into steam, and a glass jacket surrounding said tube, said glass jacket being divided into sections transversely and longitudinally for permitting expansion and contraction of the glass, and partition-rings dividing the air-space inclosed by said jacket into compartments for preventing the free circulation of the contained air, said jacket being retained in place by binding-wires held out of contact with the glass by asbestos, substantially as described.

13. In a solar generator, means for concentrating the sun's rays at a focus, a circulation tube or tubes at said focus for conveying water to be converted into steam, and a plurality of concentrically-arranged glass jackets surrounding said tube, said jackets being supported at their ends on layers of asbestos, and being divided into a plurality of sections separated by layers of asbestos, substantially as described.

14. In a solar generator, means for concentrating the sun's rays at a focus, a circulation tube or tubes at said focus for conveying water to be converted into steam, and a glass jacket surrounding said tube, a spider or plate at each end of said tube and jacket, and a connecting-rod passing through said tube and secured at its ends to said spiders for holding the parts together, substantially as described.

15. In a solar generator, means for concentrating the sun's rays at a focus, a circulation tube or tubes at said focus for conveying water to be converted into steam, and a glass jacket surrounding said tube, there being interposed in the air-space formed by said glass jacket a plurality of reflecting-plates arranged longitudinally of the jacket and tube, said plates being spaced apart and having polished reflecting-surfaces for receiving stray rays and reflecting the same toward said tube, substantially as described.

16. In a solar generator, means for concentrating the sun's rays at a focus, a circulation tube or tubes at said focus for conveying water to be converted into steam, and a glass jacket surrounding said tube, there being interposed in the air-space formed by said glass jacket a plurality of reflecting-plates arranged longitudinally of the jacket and tube, said plates being spaced apart and having polished reflecting-surfaces for receiving stray rays and reflecting the same toward said tube, said plates being arranged in groups at different sides of the jacket, the plates of each group being parallel to each other, substantially as described.

17. In a solar generator, means for concentrating the sun's rays, a water-tube to receive said concentrated rays, a jacket surrounding said tube for providing an air-space about the tube, and means about said tube for intercepting stray rays from said concentrating means and directing them toward said tube, substantially as described.

18. In a solar generator, a reflector for directing the sun's rays, said reflector comprising a frame having endless sides and open at the top and bottom, the top opening being considerably larger than the bottom opening and the sides sloping from the top to the bottom uniformly relatively to a common axis, a plurality of reflecting-facets set edge to edge and carried by said frame to transmit the sun's rays toward the interior of the reflector, and means for independently adjusting the curvature of said facets, substantially as described.

19. In a solar generator, a reflector for directing the sun's rays, said reflector comprising a frame having endless sides and open at the top and bottom, the top opening being considerably larger than the bottom opening and the sides sloping from the top to the bottom, a plurality of reflecting facets carried by said frame to transmit the sun's rays toward the interior of the reflector, said frame having transverse supports on its inner side, said facets being mounted on said transverse supports and an interposed cushion between said supports and said facets, substantially as described.

20. In a solar generator, a reflector for directing the sun's rays, said reflector comprising a frame having endless sides and open at the top and bottom, the top opening being considerably larger than the bottom opening and the sides sloping from the top to the bottom, a plurality of reflecting-facets carried by said frame to transmit the sun's rays toward the interior of the reflector, said frame having transverse supports on its inner side, said facets being mounted on said transverse supports, and spring-clips for securing said facets to said supports, substantially as described.

21. In a solar generator, a reflector for directing the sun's rays, said reflector comprising a frame having endless sides and open at the top and bottom, the top opening being considerably larger than the bottom opening and the sides sloping from the top to the bottom, a plurality of reflecting-facets carried by said frame to transmit the sun's rays toward the interior of the reflector, said frame having transverse supports on its inner side, said facets being mounted on said transverse supports, bearing-plates back of said supports, and adjusting means operating between said plates and supports for changing the curvature of the reflector, substantially as described.

22. In a solar generator, a central axial boiler, a reflector for directing the sun's rays onto said boiler, said reflector comprising a frame having endless sides and open at top and bottom, the top opening being considerably larger than the bottom opening, and the sides sloping from top to bottom, said frame including a truss construction consisting of angle-irons running from the top to the bottom of the reflector, radial tension members at the top and bottom openings extending from said boiler to the sides of the reflector, and a transverse compression-truss including diametrical members and uprights at diametrically opposite sides of the reflector, for preventing deformation of the reflector-frame due to its weight and wind pressures opposite independent trunnions having their axes in lines with each other and passing through the center of gravity of the reflector of the foregoing, to balance the entire structure, the strains from said trunnions being taken by said uprights and by said diametrical members, the whole presenting two distinct truss systems, one including the boiler, tension members, and reflector-frame, and the other including the uprights, diametrical members and boiler, substantially as described.

23. In a solar generator, a reflector having endless converging walls, and a tension-frame for maintaining the curvature of said walls, said tension-frame comprising a central strain-ring and wires or their equivalents extending from said strain-ring to the periphery of the reflector, substantially as described.

24. In a solar generator, a reflector having endless converging walls, and a tension-frame for maintaining the curvature of said walls, said tension-frame comprising a central strain-ring and wires or their equivalents extending from said strain-ring to the periphery of the reflector, and means at one end of said wires for independently tightening the same, substantially as described.

25. In a solar generator, a reflector having endless converging walls, and a tension-frame for maintaining the curvature of said walls, said tension-frame comprising a central strain-ring and wires or their equivalents extending from said strain-ring to the periphery of the reflector, eyebolts being mounted in said strain-ring and connected at their ends to said wires, and means for adjusting said eyebolts relatively to said strain-ring, substantially as described.

26. In a solar generator, a reflector having endless converging walls open at top and bottom, and a tension-frame at its top and bottom for maintaining the proper curvature and position of the reflector, said tension-frames being composed of radial wires or thin members whereby a minimum of structure is offered to the passage of the sun's rays and the wind, substantially as described.

27. A solar generator comprising a reflector in the form of a truncated cone, said reflector at its opposite ends having trunnions, supporting-frames consisting of uprights secured to the reflector-frame, and horizontal and vertical members secured to said uprights and projecting therefrom, and struts connected to the upper ends of said uprights and to the meeting ends of said horizontal and vertical members, and trunnions secured to said supporting-frames, opposite journal-supports in which said trunnions are journaled, mechanism at one end for turning said reflector, and mechanism at the other end for adjusting said reflector vertically, substantially as described.

28. A solar generator, comprising a reflector having opposite trunnions on which to turn, journal-supports for said trunnions, the lower trunnion being pivotally connected to one support, and the upper trunnion being slidingly connected to the upper support, substantially as described.

29. A solar generator, comprising a reflector, a support for one end thereof, a casting pivoted horizontally on said support, and a pivotal connection between said casting and said reflector permitting the reflector to turn at right angles to said horizontal pivot, and means at the opposite end of said reflector for adjusting the same to different heights, substantially as described.

30. A solar generator comprising a reflector, supports for its opposite ends, one of said supports being pivoted at its base to swing toward and from the reflector, the reflector being mounted to rise and fall along the front of said support, substantially as described.

31. A solar generator, comprising a reflector, supports for its opposite ends, one of said supports comprising two trusses diverging toward their base and connected together toward their top, being pivoted at their base, and said support having a track at its front side, said reflector having a trolley to travel on said track, and means for adjusting said reflector along said track, substantially as described.

32. A solar generator, comprising a reflector, supports for its opposite ends, one of said supports being pivoted at its base to swing toward and from the reflector, said support having an arm or bracket extending rearwardly therefrom, and a counterbalance-weight carried by the free end of said arm, substantially as described.

33. A solar generator, comprising a reflector, supports for its opposite ends, one of said supports being pivoted at its base to swing toward and from the reflector, the other of said supports carrying mechanism for turning the reflector to follow the diurnal movement of the sun, said mechanism including a drum, and a cable extending from said drum to the other of said supports and having a weight at its end, said weight being supported at the rear of said pivoted base whereby it acts as a counterbalance for the support, and as a driving power for said mechanism, substantially as described.

34. A solar generator, comprising a reflector, supports for its opposite ends, trunnions journaled in said supports, mechanism adjacent one of said trunnions for turning the reflector, said mechanism including an actuating-weight and a wheel and a power belt or chain adapted to be driven from any adjacent source of power, substantially as described.

35. A solar generator, comprising a reflector, supports for its opposite ends, trunnions journaled in said supports, mechanism adjacent one of said trunnions for turning the reflector, said mechanism comprising a series of gear-wheels, a worm-wheel for driving the same, a worm in mesh with said worm-wheel, governing mechanism for regulating the speed of movement of said gears, and clutch mechanism for connecting or disconnecting said governing mechanism with said gear-wheels, substantially as described.

36. A solar generator comprising a reflector, supports for its opposite ends, trunnions journaled in said supports, mechanism adjacent one of said trunnions for turning the reflector, said mechanism comprising a series of gear-wheels, a worm-wheel for driving the same, a worm in mesh with said worm-wheel, governing mechanism for regulating the speed of movement of said gears, and clutch mechanism for connecting or disconnecting said governing mechanism with said gear-wheels, and a shaft extended at one end and provided with means for receiving a turning key or device for turning the reflector by hand, substantially as described.

37. In a solar generator, a steam-generating apparatus including a boiler, having about the boiler a plurality of reflecting-plates extending edgewise thereto and longitudinally thereof, for receiving and gathering in the sun's rays, substantially as described.

38. In a solar generator, a steam-generating apparatus including a boiler, having about the boiler a plurality of reflecting-plates extending edgewise thereto and longitudinally thereof, for receiving and gathering in the sun's rays, said plates being arranged in groups of parallel plates, substantially as described.

39. In a reflector for a solar generator, a plurality of reflecting-facets, and a frame for supporting the same, said facets being secured in place by independent spring-clips, or other yielding medium, whereby individual facets may readily be moved or replaced without disturbing other facets, substantially as described.

40. In a solar generator, a reflector-surface made up of a plurality of relatively small and normally plane facets, and means for springing or curving said facets very slightly with respect to two axes at right angles to each other, substantially as described.

41. A solar generator comprising a reflector, means for changing the position of said reflector, a water-tube boiler having a portion of itself in the focus of said reflector, and having a combined steam and water drum, and also a mud-drum, both located out of the focus of said reflector, and all three being in the circuit through which the water circulates, said steam-generator having the portion thereof which is in the focus of the reflector mounted in position to be constantly filled with freely-circulating water, substantially as described.

42. In a solar generator, a reflector, a water-tube boiler or steam-generator apparatus composed of a section in the direct influence of said reflector for receiving the heating-rays, and a combined steam and water drum, and a mud-drum out of the direct influence of said reflector, said two drums and said section being connected together and together constituting the circulatory system through which the water flows, and means for maintaining said section constantly filled with freely-circulating water, substantially as described.

43. In a solar generator, a reflector, a support therefor at opposite sides of the reflector, a ring pivotally mounted at opposite sides in said support, and said reflector being journaled in said ring at right angles to the pivotal bearings of said ring, means adjusting said reflector for the annual movement of the sun, and means for giving said reflector a diurnal movement, substantially as described.

44. In a solar generator, a reflector made up of a large number of relatively small independent facets, said reflector being in the form of a truncated cone open at top and bottom, the supporting-frame for said reflector including an independent backing for the reflector, the said facets being capable of adjustment, independent of each other and of said backing, to change the curvature of the reflector as a whole, substantially as described.

45. A solar generator comprising a reflector, a support therefor, and means for changing the position of said reflector, said reflector having a conical form, open at top and bottom, being truncated above its apex at such a distance as to provide a relatively large opening as and for the purpose described, and steam-generating apparatus located in the focus of said reflector, substantially as described.

In testimony whereof I have signed my name to this specification in the presence of two subscribing witnesses.

AUBREY G. ENEAS.

Witnesses:
BENJAMIN W. THAYER,
GEORGE W. BOWEN.

It is hereby certified that in Letters Patent No. 670,916, granted March 26, 1901, upon the application of Aubrey G. Eneas, of Boston, Massachusetts, for an improvement in "Solar Generators," errors appear in the printed specification requiring correction, as follows: In line 81, page 8, the word "lines" should read *line;* and in line 120, page 9, the word "moved" should read *removed;* and that the said Letters Patent should be read with these corrections therein that the same may conform to the record of the case in the Patent Office.

Signed, countersigned, and sealed this 2d day of April, A. D., 1901.

[SEAL.]

F. L. CAMPBELL,
*Assistant Secretary of the Interior.*

Countersigned:
F. I. ALLEN,
*Commissioner of Patents.*